(12) United States Patent
Filoti

(10) Patent No.: US 11,913,435 B2
(45) Date of Patent: Feb. 27, 2024

(54) PORTABLE WIND ENERGY CONVERSION SYSTEM AND RELATED TECHNIQUES

(71) Applicant: Octavian F. Filoti, Portsmouth, NH (US)

(72) Inventor: Octavian F. Filoti, Portsmouth, NH (US)

(*) Notice: Subject to any disclaimer, the term of this patent is extended or adjusted under 35 U.S.C. 154(b) by 0 days.

(21) Appl. No.: 18/096,902

(22) Filed: Jan. 13, 2023

(65) Prior Publication Data

US 2023/0145989 A1 May 11, 2023

Related U.S. Application Data

(63) Continuation of application No. 17/182,663, filed on Feb. 23, 2021, now Pat. No. 11,555,479.

(51) Int. Cl.
*F03D 9/32* (2016.01)
*F03D 9/11* (2016.01)
(Continued)

(52) U.S. Cl.
CPC ............ *F03D 9/32* (2016.05); *F03D 7/022* (2013.01); *F03D 9/11* (2016.05); *F03D 9/25* (2016.05);
(Continued)

(58) Field of Classification Search
CPC ........ F03D 9/32; F03D 9/30; F05B 2240/923; F05B 2240/931
See application file for complete search history.

(56) References Cited

U.S. PATENT DOCUMENTS

| 5,448,223 A | 9/1995 | Johnson |
| 6,838,782 B2 | 1/2005 | Vu |

(Continued)

FOREIGN PATENT DOCUMENTS

| GB | 2490377 A | 10/2012 |
| GB | 2556035 A | 5/2018 |

OTHER PUBLICATIONS

"Micro Generator Technology", Kinetron, Generator Technology, https://www.kinetron.eu/technology/generator-technology, downloaded Aug. 4, 2022, 4 pages.
(Continued)

*Primary Examiner* — David E Sosnowski
*Assistant Examiner* — Maxime M Adjagbe
(74) *Attorney, Agent, or Firm* — Hayes Soloway PC

(57) ABSTRACT

A portable system for converting wind energy into electrical energy is disclosed. The disclosed system may include a frame hosting one or more conversion modules, arranged as desired. A given conversion module may include one or more wind energy conversion devices (WECDs), arranged as desired. The conversion modules may be electrically connected, directly or indirectly, with one or more downstream electrical energy storage elements (e.g., such as a battery or other capacitive element, optionally native to a host platform). In this manner, the disclosed system may be configured for use in storing and/or supplying electric power for downstream consumption by a host platform or otherwise. In a more general sense, the disclosed system may be utilized, for example, for micro-generation of renewable electrical energy from wind.

20 Claims, 3 Drawing Sheets

(51) Int. Cl.
*F03D 9/25* (2016.01)
*F03D 7/02* (2006.01)
*F03D 13/20* (2016.01)
*F03D 9/30* (2016.01)

(52) U.S. Cl.
CPC .............. *F03D 9/30* (2016.05); *F03D 13/20* (2016.05); *F05B 2240/923* (2013.01); *F05B 2240/931* (2013.01); *F05B 2240/941* (2013.01)

(56) References Cited

U.S. PATENT DOCUMENTS

| | | | |
|---|---|---|---|
| 6,897,575 B1 | 5/2005 | Yu | |
| 8,253,262 B1 | 8/2012 | Kiler | |
| 8,598,838 B2* | 12/2013 | Cunico | B60L 8/006 320/101 |
| 8,967,302 B2 | 3/2015 | Tran | |
| 9,738,330 B2 | 8/2017 | Wolf | |
| 10,605,231 B1 | 3/2020 | Corbell, Sr. | |
| 10,890,161 B1* | 1/2021 | Vemuri | F03D 9/007 |
| 2003/0057707 A1* | 3/2003 | Wu | F03D 9/32 290/55 |
| 2005/0046195 A1 | 3/2005 | Kousoulis | |
| 2006/0278445 A1 | 12/2006 | Chang | |
| 2006/0278448 A2 | 12/2006 | Chang | |
| 2008/0266758 A1 | 10/2008 | Hurt | |
| 2011/0031043 A1 | 2/2011 | Armani et al. | |
| 2011/0291420 A1 | 12/2011 | Gu | |
| 2012/0187695 A1* | 7/2012 | Desplats | F03D 15/10 290/55 |
| 2020/0200147 A1 | 6/2020 | Dietzel | |
| 2022/0268258 A1 | 8/2022 | Filoti | |

OTHER PUBLICATIONS

Ahmed et al., "Farms of triboelectric nanogenerators for harvesting wind energy: A potential approach towards green energy", Elsevier, Nano Energy, vol. 36, Jun. 2017, pp. 21-29, Abstract, 2 pages.
Reuther and Thull, "Feasibility Study of Small and Micro Wind Turbines for Residential Use in New Zealand", Land Environment & People, LEaP Research Report No. 30, Dec. 2011, 116 pages.
Borunda et al., "Technical assessment of small-scale wind power for residential use in Mexico: A Bayesian intelligence approach", Journal PloS ONE, vol. 15, Issue 3, Mar. 12, 2020, 17 pages.
Fields et al., "Deployment of Wind Turbines in the Built Environment: Risks, Lessons, and Recommended Practices", Technical Report National Renewable Energy Laboratory, U.S. Department of Energy Office of Energy Efficiency & Renewable Energy, Jun. 2016, 55 pages.
Christiner et al., "Rooftop Wind Turbine Feasibility in Boston, Massachusetts", An Interactive Qualifying Project: submitted to the faculty of Worcester Polytechnic Institute, May 4, 2010, 92 pages.
Li et al., "A Review of Micro Wind Turbines in the Built Environment", IEEE Xplore, Asia-Pacific Power and Energy Engineering Conference, Apr. 15, 2020, Abstract, 1 page.
Asnaz, "A case study: Small scale wind turbine system selection and economic viability", Editorial Board Members of UEAT, International Journal of Energy Applications and Technologies, vol. 5, Issue 4, 2018, 8 pages.

* cited by examiner

PORTABLE WIND ENERGY CONVERSION SYSTEM AND RELATED TECHNIQUES

CROSS-REFERENCE TO RELATED APPLICATIONS

This patent application is a Continuation of U.S. patent application Ser. No. 17/182,663, filed on Feb. 23, 2021, which is herein incorporated by reference in its entirety.

FIELD OF THE DISCLOSURE

The present disclosure relates to renewable energy generation and more particularly to wind-based micro-generation and micro-power.

BACKGROUND

Wind energy generally refers to the kinetic energy of air in motion. Wind turbines may be used to convert wind energy into electrical energy. Wind turbines typically are of either vertical-axis or horizontal-axis configuration, referring to the axis about which the wind turbine rotates in operation.

SUMMARY

The subject matter of this application may involve, in some cases, interrelated products, alternative solutions to a particular problem, and/or a plurality of different uses of a single system or article.

One example embodiment provides a user-portable wind energy conversion system. The system includes a frame configured for mounting to a target mounting surface by a user. The system also includes at least one wind energy conversion module including at least one wind energy conversion device (WECD) configured to generate electrical energy from movement of wind relative to the at least one WECD, wherein the at least one wind energy conversion module is configured to be hosted by the frame and electrically connected with at least one electrical energy storage element external to the wind energy conversion system.

In some cases, the at least one WECD is configured as a wind energy conversion microdevice. In some cases, the at least one WECD has at least one of a length, a width, and a height in the range of about 50 mm or less. In some cases, the at least one WECD has at least one of a length, a width, and a height in the range of about 10 mm or less.

In some cases, in being configured to generate electrical energy from movement of wind relative thereto, the at least one WECD is configured to convert the wind energy first to mechanical energy in a manner like a horizontal axis wind turbine (HAWT). In some cases, in being configured to generate electrical energy from movement of wind relative thereto, the at least one WECD is configured to convert the wind energy first to mechanical energy in a manner like a vertical axis wind turbine (VAWT). In some cases, in being configured to generate electrical energy from movement of wind relative thereto, the at least one WECD is configured to convert the wind energy first to mechanical energy in a manner like an anemometer.

In some cases, the at least one WECD is of fixed configuration, such that any blade, vane, or cup thereof is not reorientable without damaging the at least one WECD. In some cases, the at least one WECD is of adjustable configuration, such that any blade, vane, or cup thereof is reorientable without damaging the at least one WECD.

In some cases, the at least one WECD includes: at least one WECD of a first type; and at least one WECD of a second type which differs from the first type. the at least one wind energy conversion module includes: a first wind energy conversion module including at least one WECD of a first type; and a second wind energy conversion module including at least one WECD of a second type which differs from the first type. In some cases, the at least one WECD includes a plurality of WECDs arranged in a regular array. In some cases, the at least one WECD includes a plurality of WECDs arranged in a semi-regular array. In some cases, the at least one WECD includes a plurality of WECDs arranged in an irregular array.

In some cases, the frame includes a plurality of frame slots, wherein each frame slot is configured to receive and retain at least one wind energy conversion module therein. In some such instances, the plurality of frame slots includes: at least one frame slot of a first type; and at least one frame slot of a second type which differs from the first type. In some cases, the plurality of frame slots is arranged in a regular array. In some cases, the plurality of frame slots is arranged in a semi-regular array. In some cases, the plurality of frame slots is arranged in an irregular array.

In some cases: the system further includes a surface mounting portion configured to be mounted to the target mounting surface; and the frame includes a frame mounting portion configured to be connected with the surface mounting portion such that the frame is configured to be indirectly mounted to the target mounting surface. In some cases: the system further includes a surface mounting portion configured to be mounted to the target mounting surface; an extension portion configured to be connected with the surface mounting portion, wherein the extension portion is configured to change in at least one physical dimension during use thereof; and the frame includes a frame mounting portion configured to be connected with the extension portion such that the frame is configured to be indirectly mounted to the target mounting surface.

In some cases, the system further includes a substrate hosting the at least one WECD. In some such instances, the substrate includes a circuit board.

In some cases, the system further includes the electrical energy storage element. In some such instances, the electrical energy storage element includes a battery. In some cases, the system further includes a photovoltaic module configured to generate electrical energy from light, wherein the photovoltaic module is also configured to be hosted by the frame and electrically connected with the at least one electrical energy storage element external to the wind energy conversion system.

Another example embodiment provides a user-portable wind energy conversion system. The system includes at least one wind energy conversion module. The at least one wind energy conversion module includes: a substrate; and at least one wind energy conversion microdevice hosted by the substrate and configured to generate electrical energy from movement of wind relative to the at least one wind energy conversion microdevice, wherein the at least one wind energy conversion microdevice has at least one of a length, a width, and a height in the range of about 50 mm or less. The system also includes a frame hosting the at least one wind energy conversion module, wherein the frame is configured for mounting to a target mounting surface by a user and is configured to electrically connect the at least one wind energy conversion module with at least one electrical energy storage element external to the wind energy conversion system. In some cases, the at least one wind energy conversion microdevice has at least one of a length, a width, and a height in the range of about 10 mm or less.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
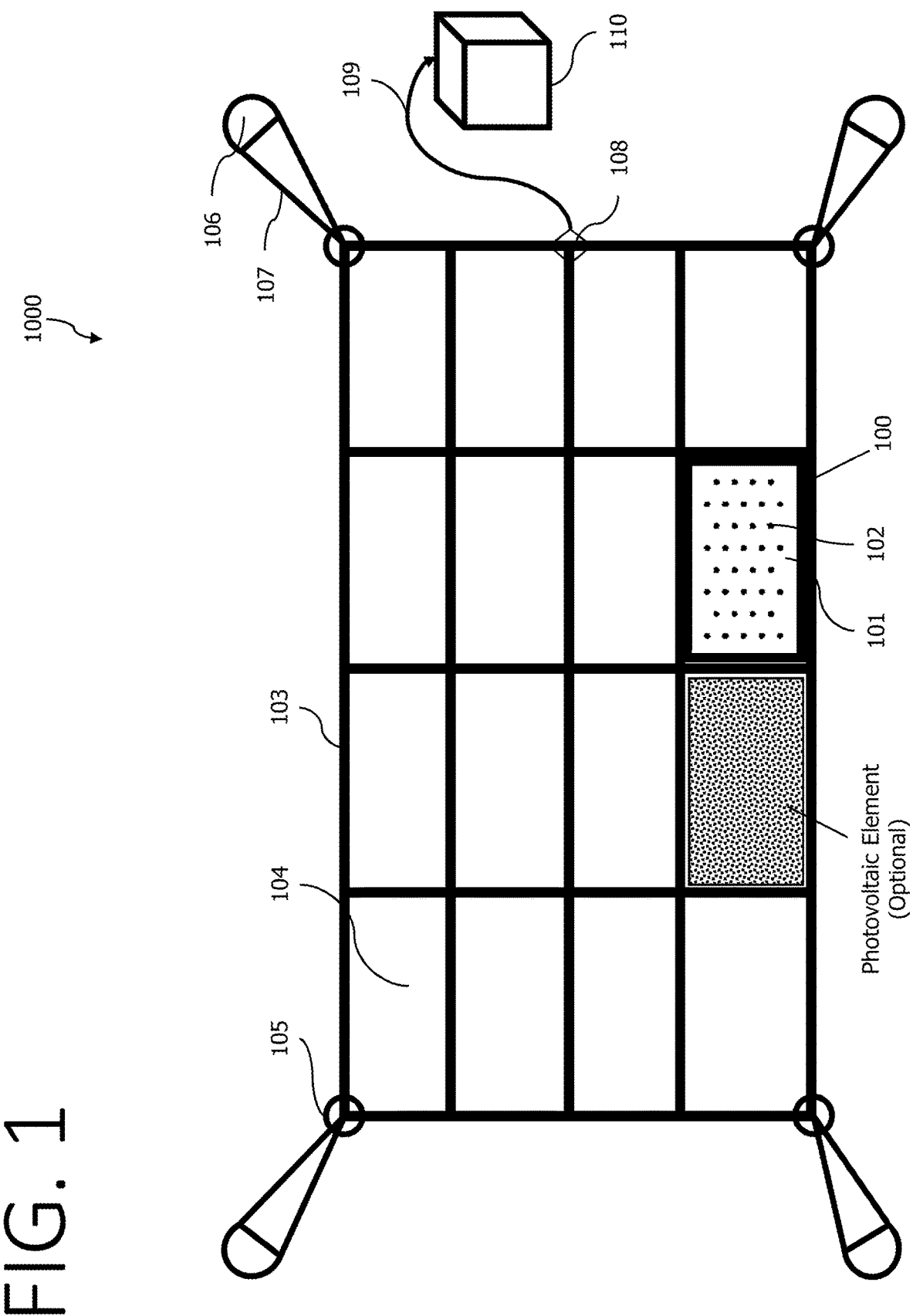
FIG. 1 illustrates a wind energy conversion system configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A portable system for converting wind energy into electrical energy is disclosed. The disclosed system may include a frame hosting one or more conversion modules, arranged as desired. A given conversion module may include one or more wind energy conversion devices (WECDs), arranged as desired. In accordance with some embodiments, the conversion modules may be electrically connected, directly or indirectly, with one or more downstream electrical energy storage elements (e.g., such as a battery or other capacitive element, optionally native to a host platform). In this manner, the disclosed system may be configured, in accordance with some embodiments, for use in storing and/or supplying electric power for downstream consumption by a host platform or otherwise. In a more general sense, the disclosed system may be utilized, for example, for micro-generation of renewable electrical energy from wind, in accordance with some embodiments. Numerous configurations and variations will be apparent in light of this disclosure.

General Overview

In accordance with some embodiments of the present disclosure, a portable system for converting wind energy into electrical energy is disclosed. In accordance with some embodiments, the disclosed system may include a frame hosting one or more conversion modules, arranged as desired. A given conversion module may include one or more wind energy conversion devices (WECDs), arranged as desired. In accordance with some embodiments, the conversion modules may be electrically connected, directly or indirectly, with one or more downstream electrical energy storage elements (e.g., such as a battery or other capacitive element, optionally native to a host platform). In this manner, the disclosed system may be configured, in accordance with some embodiments, for use in storing and/or supplying electric power for downstream consumption by a host platform or otherwise. In a more general sense, the disclosed system may be utilized, for example, for micro-generation of renewable electrical energy from wind, in accordance with some embodiments.

In accordance with some embodiments, the disclosed system may be configured, in a general sense, as a mobile micro wind farm electrical generation network with a flexible, packable, adjustable frame. In accordance with some embodiments, the disclosed system may be configured, in a general sense, as including a farm-like network layout of micro wind energy-conversion devices (e.g., of a few millimeters in size) on a small board configured to generate cumulative electrical energy from moving air. In some cases, the disclosed system optionally may include one or more photovoltaic devices (e.g., solar power modules or elements), thereby permitting the system to generate energy from both wind and sunlight, separately or concurrently.

Generally, the disclosed system may be scaled up or down in size and energy production, as desired for a given target application or end-use. In some embodiments, the disclosed system may be configured with a generally low-profile form factor, helping to reduce drag and lift problems which otherwise can occur with larger form factors on host platforms. In some embodiments, the disclosed system may be compatible with a large variety of mounting surfaces and orientations. In some embodiments, the disclosed system may be flexible and/or packable, making it more readily transportable and mountable with a given host platform.

In some instances, a system provided using the disclosed techniques can be configured, for example, as: (1) a partially/completely assembled unit including a frame and at least one conversion module; and/or (2) a kit or other collection of discrete components (e.g., frame, one or more conversion modules, etc.) which may be operatively coupled as desired.

System Architecture and Operation

Figure 2:
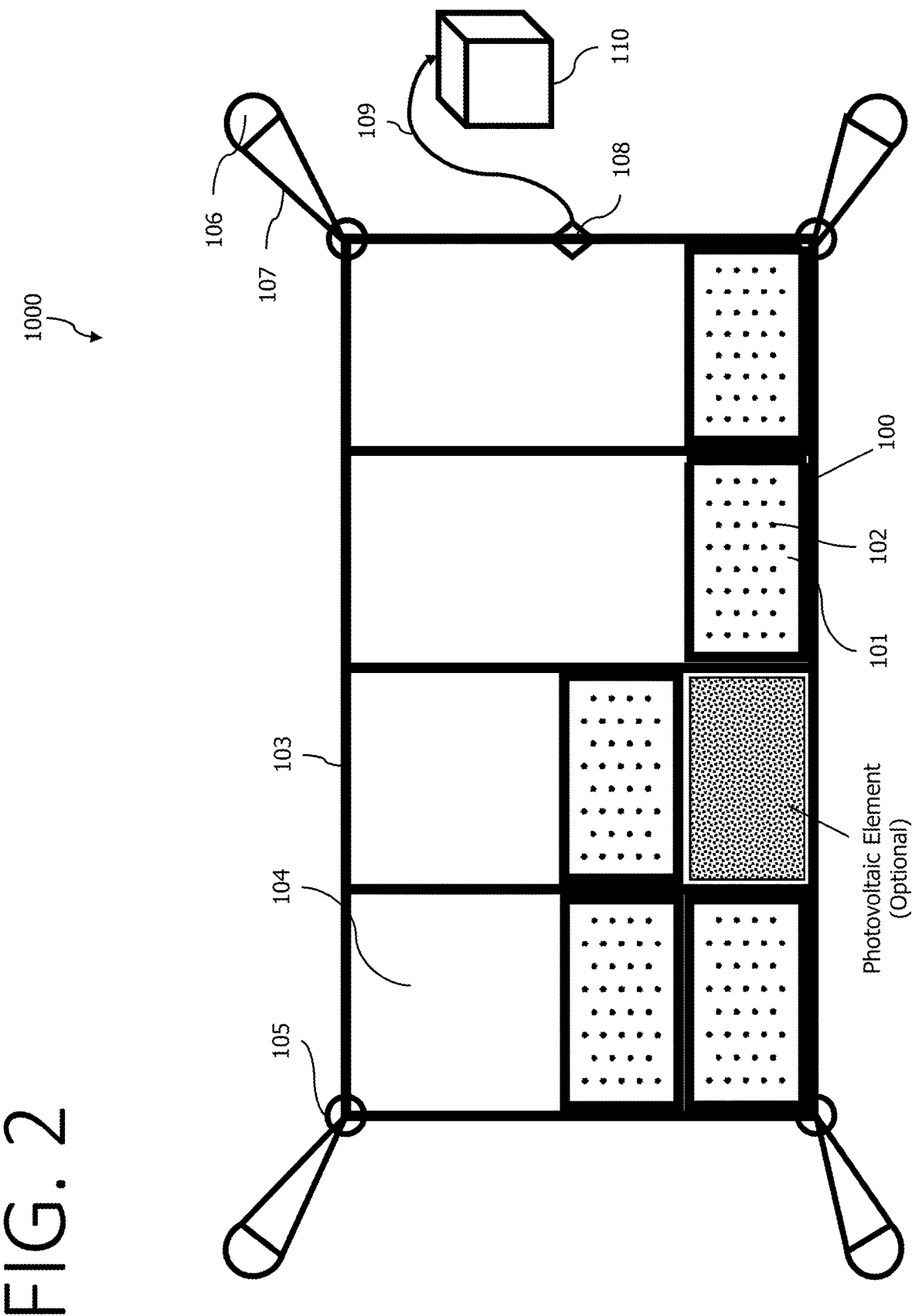
FIG. 2 illustrates a wind energy conversion system configured in accordance with another embodiment of the present disclosure.

FIG. 1 illustrates a wind energy conversion system 1000 configured in accordance with an embodiment of the present disclosure. FIG. 2 illustrates a system 1000 configured in accordance with another embodiment of the present disclosure. As can be seen from these figures, system 1000 may include one or more conversion modules 100 hosted by a frame 103 of a given configuration. In addition, system 1000 may include one or more electrical energy storage elements 110 operatively coupled (directly or indirectly) with one or more conversion modules 100. Each of these elements is discussed in turn below.

As discussed herein, system 1000 may be configured, in accordance with some embodiments, to produce electrical energy from harvested wind energy. To that end, system 1000 generally may be configured to convert the energy of wind movement into mechanical power, which in turn may be utilized in producing electricity. The electricity produced may be used immediately or stored for later use, as desired.

Figure 3:
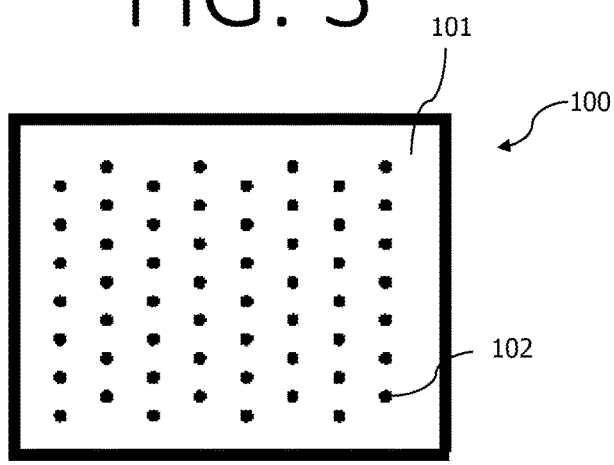
FIG. 3 illustrates a conversion module configured in accordance with an embodiment of the present disclosure.

As previously noted, system 1000 may include one or more conversion modules 100. FIG. 3 illustrates a conversion module 100 configured in accordance with an embodiment of the present disclosure. As can be seen, conversion module 100 may include one or more wind energy conversion devices (WECDs) 102 hosted by a substrate 101, each of which is discussed in turn below.

In accordance with some embodiments, a given WECD 102 may be (or otherwise may include) a device configured to convert wind energy into electrical energy. To such ends, a given WECD 102 may include, for example, a wind turbine generator element through which mechanical energy (e.g., harvested from air or other gas passing over and/or through such WECD 102) is converted into electrical energy.

The specific configuration of a given WECD 102 may be customized, as desired for a given target application or end-use. In accordance with some embodiments, a given WECD 102 may be configured (in part or in whole) like a horizontal axis wind turbine (HAWT), the blades or vanes of which may rotate along a horizontal axis (e.g., generally perpendicular to the direction of gravity), such as with a traditional (e.g., Dutch) windmill. In accordance with some embodiments, a given WECD 102 may be configured (in part or in whole) like a vertical axis wind turbine (VAWT), the blades or vanes of which may rotate along a vertical axis (e.g., generally parallel to the direction of gravity), such as with a Savonius or Darrieus (e.g., giromill) wind turbine. In accordance with some embodiments, a given WECD 102 may be configured (in part or in whole) like an anemometer, the cups or vanes of which may rotate along a horizontal or vertical axis, as desired. In accordance with some embodiments, a given WECD 102 may be configured such that the orientation of its blades, vanes, or cups is fixed and, thus, not reorientable (without damaging the WECD 102), at least with respect to wind direction. In accordance with some embodiments, a given WECD 102 may be configured such that the orientation of its blades, vanes, or cups is adjustable and, thus, reorientable (without damaging the WECD 102), at least with respect to wind direction. Other suitable configurations for a given WECD 102 will depend on a given target application or end-use and will be apparent in light of this disclosure.

The dimensions of a given WECD 102 may be customized, as desired for a given target application or end-use. In some cases, a given WECD 102 may be configured as a wind energy conversion microdevice. In some such cases, the size of a given WECD 102 may be on the order of millimeters. For example, a given WECD 102 may have a dimension (e.g., length, width, and/or height) in the range of about 500 mm or less (e.g., about 1-100 mm, about 100-200 mm, about 200-300 mm, about 300-400 mm, about 400-500 mm, or any other sub-range in the range of about 500 mm or less). In some cases, a given WECD 102 may have a dimension (e.g., length, width, and/or height) in the range of about 100 mm or less (e.g., about 1-10 mm, about 10-25 mm, about 25-50 mm, about 50-100 mm, or any other sub-range in the range of about 100 mm or less). In some cases, a given WECD 102 may have a dimension (e.g., length, width, and/or height) in the range of about 50 mm or less (e.g., about 1-25 mm, about 25-50 mm, about 10-40 mm, or any other sub-range in the range of about 50 mm or less). In some cases, a given WECD 102 may have a dimension (e.g., length, width, and/or height) in the range of about 10 mm or less (e.g., about 1-5 mm, about 5-10 mm, about 3-8 mm, or any other sub-range in the range of about 10 mm or less). In some other cases, the size of a given WECD 102 may be on the order of micrometers or nanometers or smaller still. Other suitable dimensional ranges for a given WECD 102 will depend on a given target application or end-use and will be apparent in light of this disclosure.

As previously noted, a given conversion module 100 may include a substrate 101 configured to host its one or more constituent WECDs 102. Generally, substrate 101 may be of any suitable configuration, as will be apparent in light of this disclosure. In some cases, substrate 101 may be (or otherwise may include) a board, circuit board (e.g., printed circuit board, or PCB), plate, grid, or screen, to name a few options. In some cases, substrate 101 may be (or otherwise may include) a frame, housing, or enclosure, among other options. In some cases, substrate 101 may include any one (or combination) of walls, rails, legs, or arms, for instance. Moreover, the material construction of substrate 101 (in whole or in part) may be customized, as desired for a given target application or end-use.

The geometry and dimensions of a given substrate 101 (and, thus, of the associated conversion module 100 more generally) may be customized, as desired for a given target application or end-use. For example, in some cases, substrate 101 may be of generally polygonal geometry (e.g., a triangle, rectangle, square, parallelogram, rhombus, trapezoid, pentagon, hexagon, or other desired polygonal shape). In some cases, substrate 101 may be of generally curved geometry (e.g., a circle, ellipse, arc, semi-circle, semi-ellipse, closed-curve, open-curve, or other desired curved shape). In some cases, a first portion of substrate 101 may be of generally polygonal geometry, whereas a second portion thereof may be of generally curved geometry. In some cases, substrate 101 may have two or more walls, rails, legs, arms, or other perimetral boundaries which run substantially parallel, substantially perpendicular, or at an angle (e.g., acute angle, right angle, or obtuse angle) with respect to one another. Other suitable geometries and dimensions for substrate 101 will depend on a given target application or end-use and will be apparent in light of this disclosure.

For a given conversion module 100, the constituent WECDs 102 thereof may be interfaced with substrate 101 using any of a wide range of suitable interfacing means. For instance, in some cases, a given WECD 102 may be interfaced with substrate 101 utilizing any one (or combination) of physical fitting (e.g., a friction fit, snap fit, or threaded/screw fit), mechanical fasteners (e.g., such as clamps, clips, brackets, wrapping, or rope/cord-like means), adhesive materials (e.g., such as a glue or epoxy), hook-and-loop fasteners (e.g., such as those produced by Velcro USA, Inc.), and magnetic materials, among other options. In some cases, a given WECD 102 may be interfaced with substrate 101 by partially or fully inserting or integrating such WECD 102 within such substrate 101. In some cases, a given WECD 102 may be interfaced with substrate 101 via molding, encapsulation, or thermoforming. Other suitable means for interfacing a given WECD 102 with an associated substrate 101 will depend on a given target application or end-use and will be apparent in light of this disclosure.

The arrangement of WECDs 102 for a given conversion module 100 may be customized, as desired for a given target application or end-use. For instance, in some embodiments, WECDs 102 may be distributed, in part or in whole, as a regular array in which all (or some sub-set) of WECDs 102 are arranged in a systematic manner in relation to one another. In some embodiments, WECDs 102 may be distributed, in part or in whole, as an irregular array in which all (or some sub-set) of WECDs 102 are not arranged in a systematic manner in relation to one another. In some embodiments, WECDs 102 may be distributed, in part or in whole, as a semi-regular array in which a sub-set of WECDs 102 are arranged in a systematic manner in relation to one another over a given conversion module 100, but at least one other WECD 102 is not so arranged. In some cases, WECDs 102 may be arranged in a linear, concentric, eccentric, geometric, or other arrangement, as desired. In some cases, the constituent WECDs 102 of a given conversion module 100 may be arranged uniformly, whereas in some other cases, the constituent WECDs 102 may be arranged non-uniformly. In some cases, the constituent WECDs 102 of a given conversion module 100 may be arranged in a matrix of row(s) and column(s). In some cases, the constituent WECDs 102 of a given conversion module 100 may be arranged in a two-dimensional (e.g., substantially planar) arrangement. In some cases, the constituent WECDs 102 of a given conversion module 100 may be arranged in a three-dimensional arrangement. In some cases, the constituent WECDs 102 of a given conversion module 100 may be staggered or offset from one another to a given degree. The quantity, density, and spacing between neighboring WECDs 102 of a given conversion module 100 may be customized, as desired for a given target application or end-use.

In accordance with some embodiments, a given conversion module 100 may include only a single type of WECD 102; that is, such a conversion module 100 may have a homogeneous plurality of constituent WECDs 102. In accordance with some embodiments, a given conversion module 100 may include two or more different types of WECDs 102; that is, such a conversion module 100 may have a heterogeneous plurality of constituent WECDs 102. Groupings of WECD 102 homogeneity and heterogeneity may be provided for a given conversion module 100, in accordance with some embodiments.

As previously noted, system 1000 may include a frame 103 configured to host one or more conversion modules 100. In accordance with some embodiments, frame 103 may be (or otherwise may include) a housing, enclosure, rack, bracket, or brace, to name a few options. In some cases, frame 103 may include any one (or combination) of walls, rails, legs, or arms, for instance. In some embodiments, frame 103 may be of monolithic construction, constituting a singular unitary piece, whereas in some other embodiments, frame 103 may be of polylithic construction, constituting separate pieces that may be coupled with one another (e.g., as an assembly) in a temporary or permanent manner. Assembly of a polylithic frame 103 may be provided via any one (or combination) of suitable means, including, for example, fastener(s), friction fit, mated engagement, threaded engagement, adhesive(s), and magnetic engagement, among other options. The material construction of frame 103 (in whole or in part) may be customized, as desired for a given target application or end-use. As will be appreciated in light of this disclosure, it may be desirable, at least in some instances, to ensure that frame 103 is configured to help keep environmental hazards (e.g., moisture, dust, etc.) away from hosted conversion module(s) 100.

The geometry and dimensions of frame 103 may be customized, as desired for a given target application or end-use. In some cases, frame 103 may be of generally polygonal geometry (e.g., a triangle, rectangle, square, parallelogram, rhombus, trapezoid, pentagon, hexagon, or other desired polygonal shape). In some cases, frame 103 may be of generally curved geometry (e.g., a circle, ellipse, arc, semi-circle, semi-ellipse, closed-curve, open-curve, or other desired curved shape). In some cases, a first portion of frame 103 may be of generally polygonal geometry, whereas a second portion thereof may be of generally curved geometry. In some cases, frame 103 may have two or more walls, rails, legs, arms, or other perimetral boundaries which run substantially parallel, perpendicular, or at an angle (e.g., acute angle, right angle, or obtuse angle) with respect to one another. Other suitable geometries and dimensions for frame 103 will depend on a given target application or end-use and will be apparent in light of this disclosure.

In accordance with some embodiments, frame 103 may include one or more frame slots 104 configured to receive and retain one or more conversion modules 100 in a temporary or permanent manner, as desired. A given frame slot 104 may be configured, in accordance with some embodiments, to host a plurality of conversion modules 100 in a substantially linear (e.g., a row or column) format, with such conversion modules 100 being situated substantially adjacent one another (optionally with an intervening gap or space therebetween). In accordance with some embodiments, a given frame slot 104 additionally (or alternatively) may be configured to receive and retain one or more other types of energy conversion elements (e.g., one or more photovoltaic/solar panel modules or other elements) in a temporary or permanent manner, as desired.

The geometry and dimensions of a given frame slot 104 may be customized, as desired for a given target application or end-use. In some cases, a given frame slot 104 may be of generally polygonal geometry (e.g., a triangle, rectangle, square, parallelogram, rhombus, trapezoid, pentagon, hexagon, or other desired polygonal shape). In some cases, a given frame slot 104 may be of generally curved geometry (e.g., a circle, ellipse, arc, semi-circle, semi-ellipse, closed-curve, open-curve, or other desired curved shape). In some cases, a first portion of a given frame slot 104 may be of generally polygonal geometry, whereas a second portion thereof may be of generally curved geometry. In some cases, a given frame slot 104 may have two or more walls, rails, legs, arms, or other perimetral boundaries which run substantially parallel, substantially perpendicular, or at an angle (e.g., acute angle, right angle, or obtuse angle) with respect to one another. In some instances, a given frame slot 104 may have a geometry that is similar to the geometry of frame 103; for example, if frame 103 is of generally polygonal geometry (e.g., rectangular or square), a given frame slot 104 also may be of comparable polygonal geometry. In some instances, a given frame slot 104 may have a geometry that is dissimilar to the geometry of frame 103; for example, if frame 103 is of generally polygonal geometry (e.g., rectangular or square), a given frame slot 104 may be of generally curved (e.g., circular or elliptical) geometry. Also, as will be appreciated in light of this disclosure, it may be desirable, at least in some instances, to provide a given frame slot 104 with a geometry that is readily compatible with that of the conversion module(s) 100 which it is to host. As will be further appreciated in light of this disclosure, numerous variations and combinations of geometries of frame 103, its constituent frame slot(s) 104, and hosted conversion module(s) 100 may be provided, as desired for a given target application or end-use. Other suitable geometries and dimensions for frame slot(s) 104 will depend on a given target application or end-use and will be apparent in light of this disclosure.

Conversion module(s) 100 may be interfaced with a given frame slot 104, as desired. In some embodiments, a given frame slot 104 may be configured such that a given conversion module 100 may be inserted into it from a direction generally perpendicular to a plane of frame 103. For instance, a conversion module 100 may be dropped or nested into a given frame slot 104 from above or beside frame 103. In some embodiments, a given frame slot 104 may be configured such that a given conversion module 100 may be inserted into it from a direction generally parallel to a plane of frame 103. For instance, a conversion module 100 may be slid into a given frame slot 104 from an edge or side of frame 103. In some cases, a given frame slot 104 may be configured such that any given conversion module 100 hosted thereby may be removed/replaced without requiring movement or other disruption of other conversion module(s) 100 hosted by that same frame slot 104. In some other cases, a given frame slot 104 may be configured such that a given conversion module 100 hosted thereby may be removed/replaced only by first moving or otherwise disrupting at least one other conversion module 100 hosted by that same frame slot 104.

For a given frame slot 104, conversion module(s) 100 may be interfaced therewith, in a temporary or permanent manner, using any of a wide range of suitable interfacing means. For instance, in some cases, a given conversion module 100 may be interfaced with a given frame slot 104 utilizing any one (or combination) of physical fitting (e.g., a friction fit, snap fit, or threaded/screw fit), mechanical fasteners (e.g., such as clamps, clips, brackets, wrapping, or rope/cord-like means), adhesive materials (e.g., such as a glue or epoxy), hook-and-loop fasteners (e.g., such as those produced by Velcro USA, Inc.), and magnetic materials, among other options. In some instances, a locking mechanism may be utilized to secure conversion module(s) 100 within a given frame slot 104, for example, to prevent theft and/or accidental dislodging. In some cases, a given conversion module 100 may be interfaced with a host frame slot 104 by partially or fully inserting or integrating such conversion module 100 within such frame slot 104. In some cases, a given conversion module 100 may be interfaced with a host frame slot 104 via molding, encapsulation, or thermoforming. Other suitable means for interfacing a given conversion module 100 with a given frame slot 104 will depend on a given target application or end-use and will be apparent in light of this disclosure.

The arrangement of frame slots 104 of a given frame 103 may be customized, as desired for a given target application or end-use. In some embodiments, frame 103 may include a plurality of frame slots 104 distributed, in part or in whole, as a regular array in which all (or some sub-set) of frame slots 104 are arranged in a systematic manner in relation to one another. In some embodiments, frame 103 may include a plurality of frame slots 104 distributed, in part or in whole, as an irregular array in which all (or some sub-set) of frame slots 104 are not arranged in a systematic manner in relation to one another. In some embodiments, frame 103 may include a plurality of frame slots 104 distributed, in part or in whole, as a semi-regular array in which a sub-set of frame slots 104 are arranged in a systematic manner in relation to one another over frame 103, but at least one other frame slot 104 is not so arranged. In some cases, frame slots 104 may be arranged in a linear, concentric, eccentric, geometric, or other arrangement, as desired. In some cases, frame slots 104 may be arranged uniformly, whereas in some other cases, frame slots 104 may be arranged non-uniformly. In some cases, frame slots 104 may be arranged in a matrix of row(s) and column(s). In some cases, frame slots 104 may be arranged in a two-dimensional (e.g., substantially planar) arrangement. In some cases, frame slots 104 may be arranged in a three-dimensional arrangement. In some cases, frame slots 104 may be staggered or offset from one another to a given degree. The quantity, density, and spacing between frame slots 104 of frame 103 may be customized, as desired for a given target application or end-use.

In accordance with some embodiments, a given frame 103 may include only a single type of frame slots 104; that is, such a frame 103 may have a homogeneous plurality of constituent frame slots 104. In accordance with some embodiments, a given frame 103 may include two or more different types of frame slots 104; that is, such a frame 103 may have a heterogeneous plurality of constituent frame slots 104. Groupings of frame slot 104 homogeneity and heterogeneity may be provided for a given frame 103, in accordance with some embodiments.

The arrangement of conversion modules 100 of a given frame slot 104 may be customized, as desired for a given target application or end-use. In some embodiments, a given frame slot 104 may host a plurality of conversion modules 100 distributed, in part or in whole, as a regular array in which all (or some sub-set) of conversion modules 100 are arranged in a systematic manner in relation to one another. In some embodiments, a given frame slot 104 may host a plurality of conversion modules 100 distributed, in part or in whole, as an irregular array in which all (or some sub-set) of conversion modules 100 are not arranged in a systematic manner in relation to one another. In some embodiments, a given frame slot 104 may host a plurality of conversion modules 100 distributed, in part or in whole, as a semi-regular array in which a sub-set of conversion modules 100 are arranged in a systematic manner in relation to one another over a given frame slot 104, but at least one other conversion module 100 is not so arranged. In some cases, conversion modules 100 of a given frame slot 104 may be arranged in a linear, concentric, eccentric, geometric, or other arrangement, as desired. In some cases, conversion modules 100 of a given frame slot 104 may be arranged uniformly, whereas in some other cases, conversion modules 100 of a given frame slot 104 may be arranged non-uniformly. In some cases, conversion modules 100 of a given frame slot 104 may be arranged in a matrix of row(s) and column(s). In some cases, conversion modules 100 of a given frame slot 104 may be arranged in a two-dimensional (e.g., substantially planar) arrangement. In some cases, conversion modules 100 of a given frame slot 104 may be arranged in a three-dimensional arrangement. In some cases, conversion modules 100 of a given frame slot 104 may be staggered or offset from one another to a given degree. The quantity, density, and spacing between neighboring conversion modules 100 of a given frame slot 104 may be customized, as desired for a given target application or end-use.

In accordance with some embodiments, a given frame slot 104 may include only a single type of conversion module 100; that is, such a frame slot 104 may have a homogeneous plurality of constituent conversion modules 100. In accordance with some embodiments, a given frame slot 104 may include two or more different types of conversion modules 100; that is, such a frame slot 104 may have a heterogeneous plurality of constituent conversion modules 100. Groupings of conversion module 100 homogeneity and heterogeneity may be provided for a given frame slot 104 (or frame 103 more generally), in accordance with some embodiments.

In accordance with some embodiments, frame 103 may be configured to be mounted to a given target surface in a temporary or permanent manner, as desired. The target surface may be (or otherwise may include), for example, a static surface (e.g., a surface which does not significantly change over time) or a dynamic surface (e.g., a surface which changes to a given degree over time). To such ends, frame 103 may include one or more frame mounting portions 105, in accordance with some embodiments. Frame 103 optionally further may include one or more surface mounting portions 106 and/or one or more extension portions 107, in accordance with some embodiments. Each of these elements is discussed in turn below.

A given frame mounting portion 105 may be configured, in accordance with some embodiments, to provide for mounting of frame 103 (in part or in whole) to a given target surface in a direct or indirect manner. A given frame mounting portion 105 may be native to frame 103 (e.g., a local portion of frame 103) or a non-native element assembled with frame 103 (e.g., attached to or integrated with frame 103 using suitable means) in a temporary or permanent manner, as desired. In some embodiments, frame 103 may include one or more frame mounting portions 105 configured to connect such frame 103 with one or more additional frames 103, so as to provide a system, network, grid, or array of frames 103, as desired. For instance, in some cases, multiple frames 103 may be connected with one another in a side-by-side (e.g., laterally adjacent) manner by means of one or more frame mounting portions 105. In some cases, multiple frames 103 may be connected with one another in a stacked (e.g., vertically adjacent) manner by means of one or more frame mounting portions 105. Other suitable configurations for frame mounting portion(s) 105 will depend on a given target application or end-use and will be apparent in light of this disclosure.

As noted above, frame 103 optionally may include (or be configured to interface with) one or more surface mounting portions 106, in accordance with some embodiments. A given surface mounting portion 106 may be configured to be operatively connected with a given frame mounting portion 105, so as to help frame 103 to mount indirectly with a given target surface. To such ends, a given surface mounting portion 106 may be of any of a wide range of configurations. For instance, in some cases, a surface mounting portion 106 may be (or otherwise may include) a mechanical fastener, such as a clamp, clip, bracket, wrapping, or rope/cord-like means. In some cases, a surface mounting portion 106 may be (or otherwise may include) a suction cup or other suction means. In some cases, a surface mounting portion 106 may be (or otherwise may include) an adhesive means. In some cases, a surface mounting portion 106 may be (or otherwise may include) a hook-and-loop fastener means (e.g., such as those produced by Velcro USA, Inc.). In some cases, a surface mounting portion 106 may be (or otherwise may include) a magnetic material.

In accordance with some embodiments, frame 103 may be configured for interchangeable use with a variety of different surface mounting portions 106. Thus, in a more general sense, such a frame 103 may be adaptable for mounting with a variety of different target surfaces. As will be appreciated in light of this disclosure, it may be desirable to utilize one or more surface mounting portions 106, for instance, if the dimensions, contour, or material composition of a given target surface otherwise would make mounting of frame 103 thereto difficult. The quantity and arrangement of surface mounting portions 106 may be customized, as desired for a given target application or end-use. Other suitable configurations for surface mounting portion(s) 106 will depend on a given target application or end-use and will be apparent in light of this disclosure.

As noted above, frame 103 optionally may include (or be configured to interface with) one or more extension portions 107, in accordance with some embodiments. A given extension portion 107 may be configured to be operatively connected with both a given frame mounting portion 105 and a given surface mounting portion 106, so as to help frame 103 to mount indirectly with a given target surface. To such ends, a given extension portion 107 may be of any of a wide range of configurations. In some cases, extension portion 107 may be (or otherwise may include), for example, a collapsible element, a telescopic element, a coiled element, a spring element, an elastic element, an elastomeric element, an extendable element, a retractable element, or a compressible element, to name a few options. In some instances, extension portion 107 may be configured to be increased and/or decreased in a single physical dimension (e.g., length, width), whereas in other instances, multiple physical dimensions may be so changed. In some instances, extension portion 107 may be configured to be increased and/or decreased in tension, resistance, or restorative force.

In accordance with some embodiments, frame 103 may be configured for interchangeable use with a variety of different extension portions 107. Thus, in a more general sense, such a frame 103 may be adaptable for mounting with a variety of different target surfaces. As will be appreciated in light of this disclosure, it may be desirable to utilize one or more extension portions 107, for instance, if the dimensions, contour, or material composition of a given target surface otherwise would make mounting of frame 103 thereto difficult. The quantity and arrangement of extension portions 107 may be customized, as desired for a given target application or end-use. In some cases, extension portion 107 may be native to a given frame mounting portion 105 or a given surface mounting portion 106. In some cases, a given extension portion 107 may be physically separate and distinct from frame mounting portion(s) 105 and surface mounting portion(s) 106, being configured to be installed therebetween for providing a connection therebetween. Other suitable configurations for extension portion(s) 107 will depend on a given target application or end-use and will be apparent in light of this disclosure.

As previously noted, system 1000 may be configured such that electrical energy may be transferred from a given conversion module 100 to one or more downstream electrical energy storage elements 110, in accordance with some embodiments. To such end, frame 103 may include one or more electrical outputs 108 configured to electrically connect conversion module(s) 100 hosted by frame 103 with electrical energy storage element(s) 110, in accordance with some embodiments. Such electrical connection may be provided (in part or in whole) via one or more electrical connectors 109, which may be (or otherwise may include) a wire, cable, lead, conductive trace, interconnect, or other suitable electrical conduit or connection means, as will be apparent in light of this disclosure. In accordance with some embodiments, all (or some sub-set) of conversion modules 100 hosted by frame 103 may be electrically connected with electrical energy storage element(s) 110, as desired. The quantity and arrangement of electrical outputs 108 may be customized, as desired for a given target application or end-use. In accordance with some embodiments, connection of electrical output(s) 108 in series and/or in parallel may be provided, as desired.

In some embodiments, frame 103 may include (e.g., natively or non-natively) one or more electrical pathways and/or other circuitry (e.g., a transformer, a power controller, a voltage controller, etc.) to facilitate electrical energy transport. In some embodiments, frame 103 may include (e.g., natively or non-natively) one or more electrical storage elements which provide a form of intermediate or alternative storage of electrical energy for system 1000 (e.g., before or instead of transport to a given downstream electrical energy storage element 110).

In accordance with some embodiments, a given electrical energy storage element 110 may be a component of system 1000, whereas in some other embodiments, a given electrical energy storage element 110 may be a component separate and distinct from system 1000. Some example electrical energy storage elements 110 may include batteries, capacitors, or any other device capable of storing electrical energy on a temporary, semi-permanent, or permanent basis. In an example case, electrical energy storage element 110 may be a battery of a platform (e.g., a car, boat, etc.) hosting system 1000.

In accordance with some embodiments, electrical output 108 may be configured to be electrically connected (e.g., directly or indirectly) with an electric power consumption element, with or without the presence of an electrical energy storage element 110. For instance, electrical output 108 may be electrically connectable (directly or indirectly) with any of a wide range of electronic devices, such as mobile computing devices (e.g., a smartphone, tablet computer, laptop computer, etc.), navigation devices (e.g., a GPS device, etc.), personal electronic devices (e.g., a health monitor device, clock, etc.), and/or lighting devices (e.g., a flashlight, emergency lighting, etc.), among other options. Intervening electrical elements (e.g., a transformer, a power controller, a voltage controller, etc.) may be included in some such instances, in accordance with some embodiments.

Example Use Contexts

Figure 4:
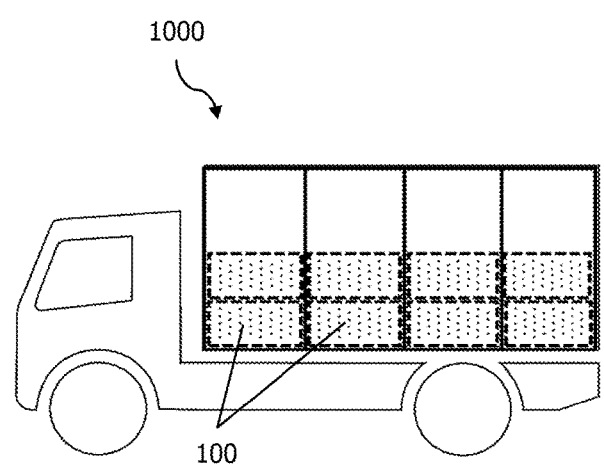
FIG. 4 illustrates an example use of a wind energy conversion system with a host box truck, in accordance with an embodiment of the present disclosure.
Figure 5:
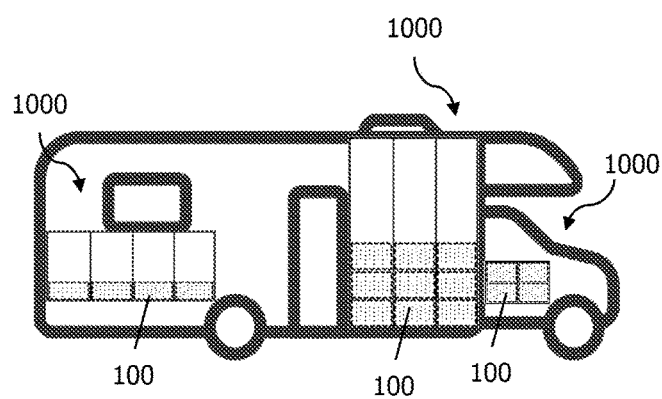
FIG. 5 illustrates an example use of a wind energy conversion system with a host recreational vehicle (RV), in accordance with an embodiment of the present disclosure.

As will be appreciated in light of this disclosure, system 1000 (in part or in whole) may be utilized with any of a wide range of host platforms in any of a wide range of applications and contexts. For example, system 1000 may be configured, in accordance with some embodiments, for use with an engine-powered vehicle, which optionally may be electrically powered, in part or in whole. For instance, consider FIG. 4, which illustrates an example use of system 1000 with a host box truck, in accordance with an embodiment of the present disclosure. Also, consider FIG. 5, which illustrates an example use of system 1000 with a host recreational vehicle (RV), in accordance with an embodiment of the present disclosure. Some other suitable vehicles which may serve as a host platform for system 1000 may include a car, van, pickup truck, semi-trailer truck, motorcycle, camper, or all-terrain vehicle (ATV), to name a few options. In accordance with some embodiments, system 1000 may be configured for use with a watercraft, such as a boat, rowboat, sailboat, personal watercraft, canoe, or kayak, among other options. In accordance with some embodiments, system 1000 may be configured for use with an aircraft, such as an airplane, helicopter, or glider, among other options. In accordance with some embodiments, system 1000 may be configured for use with a human-powered vehicle, such as a bicycle (or other pedal-driven cycle). In accordance with some embodiments, system 1000 may be utilized with a container (e.g., shipping container, cargo box, etc.) as a host platform. In accordance with some embodiments, system 1000 may be utilized with a static/fixed structure, such as a building or bunker. In accordance with some embodiments, system 1000 may be utilized with a remote-controlled vehicle, such as, for example, a radio-controlled (or other remotely controlled) car, boat, or plane, or an unmanned aerial vehicle (UAV), such as a drone, of civilian or military nature. Numerous additional and/or different possible uses for a given WECD 102, conversion module 100, or system 1000, as variously described herein, will be apparent in light of this disclosure.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A user-portable, modular wind energy conversion system comprising:
a frame having at least one frame slot; and
a first wind energy conversion module configured to be engaged with and disengaged from the at least one frame slot in a repeatable manner, the first wind energy conversion module comprising:
a first plurality of wind energy conversion devices (WECDs) configured to generate electrical energy from movement of wind relative thereto; and
a substrate having the first plurality of WECDs disposed thereon;
wherein a side of the first plurality of WECDs which is situated opposite a side with the substrate is open and uncovered;
wherein the system is configured to be electrically connected with an electrical energy storage element to store electrical energy generated by the system.

2. The system of claim 1, wherein at least one constituent WECD of the first plurality of WECDs is configured as a wind energy conversion microdevice having at least one external dimension on the order of millimeters.

3. The system of claim 2, wherein the at least one constituent WECD of the first plurality of WECDs has at least one external dimension in the range of 50 mm or less.

4. The system of claim 2, wherein the at least one constituent WECD of the first plurality of WECDs has at least one external dimension in the range of 10 mm or less.

5. The system of claim 1, wherein the frame is adjustable or flexible in structure.

6. The system of claim 1, wherein the substrate comprises a circuit board having the first plurality of WECDs populated thereon, wherein the circuit board is configured to be electrically connected with the electrical energy storage element.

7. The system of claim 1, wherein in being configured to generate electrical energy from movement of wind relative thereto, at least one constituent WECD of the first plurality of WECDs is configured to convert wind energy first to mechanical energy in a manner like at least one of a horizontal axis wind turbine (HAWT), a vertical axis wind turbine (VAWT), and an anemometer.

8. The system of claim 1, wherein the first wind energy conversion module further comprises a second plurality of WECDs configured to generate electrical energy from movement of wind relative thereto, wherein at least one constituent WECD of the first plurality of WECDs and at least one constituent WECD of the second plurality of WECDs differ in WECD type.

9. The system of claim 8, wherein in differing in WECD type, the at least one constituent WECD of the first plurality of WECDs and the at least one constituent WECD of the second plurality of WECDs are configured to convert wind energy to mechanical energy in different manners.

10. The system of claim 9, wherein in being configured to convert wind energy in different manners, the at least one constituent WECD of the first plurality of WECDs is configured to convert wind energy to mechanical energy in a manner like one of a horizontal axis wind turbine (HAWT), a vertical axis wind turbine (VAWT), or an anemometer, whereas the at least one constituent WECD of the second plurality of WECDs is configured to convert wind energy to mechanical energy in a manner like one other of a HAWT, a VAWT, or an anemometer.

11. The system of claim 1, further comprising a second wind energy conversion module configured to be engaged with and disengaged from the at least one frame slot in a repeatable manner, the second wind energy conversion module comprising a second plurality of WECDs configured to generate electrical energy from movement of wind relative thereto.

12. The system of claim 11, wherein at least one constituent WECD of the first plurality of WECDs and at least one constituent WECD of the second plurality of WECDs differ in WECD type.

13. The system of claim 12, wherein in differing in WECD type, the at least one constituent WECD of the first plurality of WECDs and the at least one constituent WECD of the second plurality of WECDs are configured to convert wind energy to mechanical energy in different manners.

14. The system of claim 13, wherein in being configured to convert wind energy in different manners, the at least one constituent WECD of the first plurality of WECDs is configured to convert wind energy to mechanical energy in a manner like one of a horizontal axis wind turbine (HAWT), a vertical axis wind turbine (VAWT), or an anemometer, whereas the at least one constituent WECD of the second plurality of WECDs is configured to convert wind energy to mechanical energy in a manner like one other of a HAWT, a VAWT, or an anemometer.

15. The system of claim 1, further comprising the electrical energy storage element.

16. The system of claim 1, further comprising a photovoltaic module configured to generate electrical energy from light and to be engaged with and disengaged from the at least one frame slot in a repeatable manner.

17. The system of claim 16, wherein the at least one frame slot is configured to retain the first wind energy conversion module and the photovoltaic module in a same plane of the frame.

18. The system of claim 1, wherein the at least one frame slot comprises a plurality of frame slots arranged in matrix format including a plurality of constituent rows and a plurality of constituent columns provided in a substantially planar arrangement.

19. The system of claim 18, wherein the system comprises multiple instances of the first wind energy conversion module distributed among the plurality of constituent rows and the plurality of constituent columns of the plurality of frame slots arranged in matrix format.

20. The system of claim 1, wherein in being configured to be engaged with and disengaged from the at least one frame slot in a repeatable manner, the first wind energy conversion module is engageable and disengageable by hand by a user.

* * * * *